United States Patent [19]
Meissner

[11] 3,927,846
[45] Dec. 23, 1975

[54] SAFETY BELT UNWINDING DEVICE WITH ENERGY DISSIPATOR

[75] Inventor: Wolfgang Meissner, Wengern, Ruhr, Germany

[73] Assignee: Gebr. Happich GmbH, Germany

[22] Filed: July 22, 1974

[21] Appl. No.: 490,885

[30] Foreign Application Priority Data
Sept. 6, 1973 Germany.............................. 2344878

[52] U.S. Cl.............................. 242/107.4; 242/156
[51] Int. Cl.².......................................... B65H 75/48
[58] Field of Search............. 242/107, 107.3, 107.4, 242/75.4, 156; 297/386–388; 280/150 SB

[56] References Cited
UNITED STATES PATENTS

| | | | |
|---|---|---|---|
| 3,561,690 | 2/1971 | Muskat........................... | 242/75.4 X |
| 3,666,198 | 5/1972 | Neumann......................... | 242/107.4 |
| 3,790,099 | 2/1974 | Beller............................... | 242/107.4 |
| 3,857,528 | 12/1974 | Fiala................................ | 242/107.4 |

Primary Examiner—Leonard D. Christian
Attorney, Agent, or Firm—Ostrolenk, Faber, Gerb & Soffen

[57] ABSTRACT

A safety belt is wound on a sleeve shaped, hollow spool; the spool is carried at each end by a respective abutment inside the spool; a spindle supports the abutments; one abutment is axially movable along the spindle upon rotation of that abutment; the other abutment is axially stationary along the spindle; the belt spool is connected with the one abutment to rotate same as the spool rotates; an energy dissipator element sleeve separate from and inside the spool sleeve extends between the abutments; one of the abutments and the dissipator element are deformable and when the axially movable abutment moves toward the other, the deformable part deforms and its resistance to deformation dissipates kinetic energy. A preferred arrangement has the dissipator element deformable and has a non-movable abutment of larger cross-section to deform said dissipator element.

30 Claims, 6 Drawing Figures

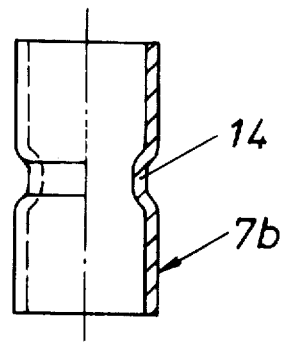
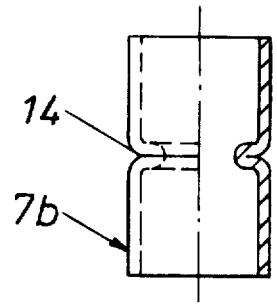
Fig 3        Fig 4
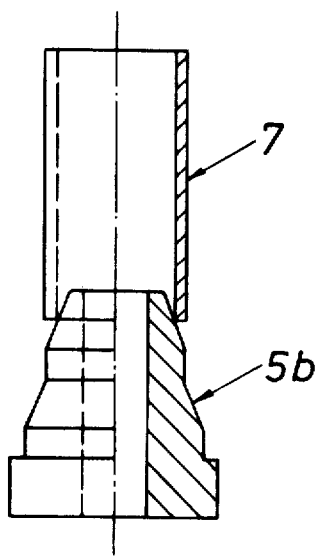
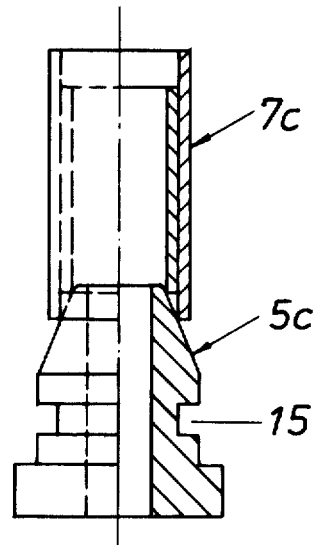
Fig 5        Fig 6

SAFETY BELT UNWINDING DEVICE WITH ENERGY DISSIPATOR

BACKGROUND OF THE INVENTION

This invention relates to safety belts and to belt unwinding devices associated with the belt and particularly relates to an energy dissipator for reducing the kinetic energy of unwinding within a predetermined short extent of unwinding of the belt.

Safety belts of the type with which the invention is intended to be used have a principal application in automotive vehicles for protecting the occupants of the vehicles against harm in a collision. Each safety or seat belt is usually wound upon a carrying spool. It is unwound at a gradual rate to be drawn around the person or object being protected so as to be fastened in place. On occasion, the belt can be unwound slowly after it is fastened around the wearer to permit limited freedom of movement of the strapped person. However, in the event of a sharp jerk on the belt, as in a collision, it is desirable to slow the unwinding of the belt and reduce the kinetic energy and movement of the wearer.

DESCRIPTION OF THE PRIOR ART

In a typical belt unwinding device with energy dissipating means, the spool on which the belt is wound is connected with an abutment held on a screw spindle. The unwinding of the belt rotates the abutment. The abutment is so mounted on and connected with the spindle that rotation of the abutment moves it axially along the screw spindle. Thus, axial motion of the abutment causes deformation of a relatively hard and strong structural part. The deformation of the structural part absorbs and thereby dissipates the kinetic energy of the unwinding.

In some known embodiments of the above described safety belt unwinding device, the belt is not reliably guided to unwind. This particularly occurs because the spool on which the belt is wound does not maintain a constant position. In one embodiment, the spool itself is one of the deformable elements which serves to dissipate energy. In another embodiment, the housing which carries the spool and the spindle is deformed, so that the bearings of the rotatable spool, spindle, abutments, etc., necessarily cant with respect to each other, disturbing the desired rotation characteristics of the unwinding. In the foregoing circumstances, the course of energy dissipation cannot be accurately predicted, because it is dependent upon the manner in which parts deform, and this is not constant and assured. The unwinding belt frequently cants and becomes stuck on the sidewalls of the housing or an additional uncontrolled and unpredictable inhibition to motion develops due to the shifting of the bearings. It is not unusual to have premature seizing of the bearings, with the result that the belt will not unwind at all or will improperly unwind.

SUMMARY OF THE INVENTION

It is a principal object of the invention to provide an unwinding device for a safety belt that has an energy dissipator, which unwinding device is compact, is comprised of a few simple parts, and which is reliable even if the belt is withdrawn obliquely to the winding plane, as usually occurs in practice.

According to the invention, the energy dissipator means in the housing is a separate element from the winding sleeve on which the belt is wound. Yet, the dissipator means is associated with the rotational motion of the winding sleeve to dissipate its energy of unwinding. The spool on which the belt is wound is a hollow sleeve that extends across the housing. Extending through this sleeve and across the housing is a non-rotatable screw spindle. The spool is freely rotatable around the spindle.

Positioned on the screw spindle is a mating, rotatable first abutment, such as a nut. Rotation of the first abutment around the spindle moves the abutment axially along the spindle. The belt winding spool sleeve is secured to the first abutment such that rotation of the spool correspondingly rotates this abutment and displaces it axially. Axially non-movably supported about, although freely rotatable about the spindle, is a second abutment. The second abutment is axially spaced from the first abutment and the first abutment is movable by rotation thereof toward and away from the second abutment. The first abutment and spindle are arranged and engaged, e.g. by appropriate mating screw threading, to cause the first abutment to move toward the second abutment upon belt unwinding.

An energy dissipator element extends between the second abutment and the first abutment. The first abutment presses the dissipator element toward the second abutment. At least one of the first abutment, second abutment, and energy dissipator element is comprised of a relatively hard, yet deformable material. Movement of the first abutment toward the second abutment upon unwinding of the belt squeezes the above-described parts together and forces the deformable part to deform about one of the non-deformable parts, and this resisted deformation absorbs the kinetic energy of rapid unwinding.

In a preferred embodiment, it is the dissipator element that is deformable. Movement together of the abutments squeezes and deforms the dissipator element and, in a preferred arrangement, forces the dissipator element to deform around and then move past the non-deformable second abutment. Here the dissipator element and second abutment are cooperatively shaped, e.g. by having different cross-sections, to cause the second abutment to resist the movement past it of the dissipator element. The resistance provided by the second abutment to motion past it of the dissipator element causes deformation of the dissipator element and it is this resistance and deformation of the dissipator element which absorbs the kinetic energy of rapid belt unwinding.

The foregoing arrangement has the benefit that neither the spool that carries the belt nor the parts responsible for the safe support of the belt, such as the housing, spindle and bearings, are deformed. This also produces a simplified construction because the non-deformed parts of the unwinding device, particularly the housing and the spindle, serve as the bearing axle for the winding sleeve.

In one embodiment, the second abutment, which is nonmovable axially with respect to the screw spindle, is integrally formed with the screw spindle. In a particular embodiment, the screw spindle may be a conventional bolt provided with a polygonal head, e.g., a hexagonal head.

In the latter embodiment, the first abutment, which is axially guided along the screw spindle, may be a conventional nut, more particularly a polygonally externally profiled nut, and even more particularly a hexagonally profiled nut. To join the belt winding spool sleeve with this polygonally profiled first abutment, the interior of the winding sleeve has a profile that extends along the axis of the sleeve and that is shaped to mate with the exterior profile of the nut, leaving a minimal air gap to enable an axially sliding fit between the nut and the spool sleeve. Rotation of the spool necessarily also rotates the mating nut. The nut at the same time slides axially through the winding sleeve.

One of the advantages of using a conventional screw as the spindle and a conventional nut as the first abutment is their inexpensive, general availability, thereby minimizing the number of required specially manufactured tools and parts.

Although in the preferred embodiments it is the energy dissipator element itself that is deformed, in alternate embodiments, or even in the same embodiment, one or both of the abutments may be a deformed or deformable element. Alternatively, a special deformation element may be interposed at a point between the abutments or may be part of the dissipator element, and it is just this deformation element which is deformed by moving together of the abutments.

In a preferred embodiment of the invention, the energy dissipator element between the two abutments is comprised of a sleeve located in the housing of the unwinding device and preferably located within the winding spool sleeve. The energy dissipator element sleeve is deformable and is comprised of a hard, slightly flexible, resilient material which predictably deforms as it moves past one of the abutments. That abutment is shaped, e.g. wider than the sleeve, to deform the sleeve. Alternatively, the dissipator element might be a rigid, non-deformable element and the deformable element would be included in at least one of the abutments past which the dissipator element would move.

The non-deformable elements may be comprised of an appropriately strong, rigid material such as metal or a quite rigid plastic. The deformable element material may be comprised of a more flexible material, such as a thinner metal sheet or a flexible plastic material that is designed with the appropriate resistance to deformation for the particular application.

Where the dissipator element is sleeve-shaped and where it is the dissipator element that is deformed, the dissipator element may be in the form of a simple, uniform cross-section sleeve. One abutment, preferably the second abutment, would be shaped to cause deformation of the dissipator element as it moves by that abutment.

In an alternate arrangement, the sleeve type dissipator element can have other forms which are advantageous in other applications. In one embodiment, the sleeve type dissipator element has at least one crimp spaced between its axial ends. These crimps axially collapse when the abutments squeeze the dissipator element. The dissipator element sleeve thereby compresses like a bellows.

In another arrangement, the sleeve type dissipator element can be deformed by changes in its cross-section as a result of passing over an appropriately shaped shoulder or arrangement of shoulders on at least one of the abutments. One or both of the abutments can be appropriately and variably shaped axially along the spindle, such that the energy dissipation characteristics of the dissipator element varies as the dissipator element moves over the varyingly shaped abutment. In one simple form of the invention, the abutment might include a conically tapering shoulder such that the sleeve type dissipation element will experience increasing resistance to further movement as it moves past that abutment. Alternatively, the abutment might have a simple circumferential bead at its leading edge.

In yet another embodiment, at least one of the abutments has a plurality of differently shaped beads and shoulders spaced axially along the abutment, with the beads having varying cross-sections, tapers, or the like. The energy dissipation curve of the dissipator element will vary in a predetermined manner according to the extent to which the unwinding sleeve and belt have been unwound. This arrangement may also include a circumferential groove or indentation at an axial location along the abutment.

Experience has shown that major fluctuations in energy dissipation can be expected at the first contact between both abutments and the dissipator elements at the commencement of energy dissipation. In order to prevent the undesired fluctuations at the start of dissipation, it is advisable to start and hold the energy dissipator element of the unwinding device in a position having a predetermined torque or prestressed condition, e.g. the dissipator element has already begun moving past the one abutment before any stress to be absorbed from rapid unwinding has been applied.

Accordingly, as noted above, it is the primary object of the invention to provide an improved belt unwinding device with an energy dissipator.

It is another object of the present invention to provide such an unwinding device which provides predictable predetermined unwinding characteristics.

It is a further object of the invention to provide such an unwinding device which avoids deformation of the elements that support the belt.

It is another object of the invention to provide an unwinding device having an energy dissipator which is not an element that directly supports the belt being unwound.

These and other objects of the invention will become apparent from the following description of the accompanying drawings.

BRIEF DESCRIPTION OF THE DRAWINGS.

FIGS. 3 and 4 are views partially in section which show an energy dissipator element of yet another embodiment of the invention in two different operative conditions.

FIG. 5 is a view partially in section which shows a portion of the energy dissipator element and one abutment of yet another embodiment of the invention.

FIG. 6 is a view partially in section which shows a portion of the energy dissipator element and one abutment of still another embodiment of the invention.

DETAILED DESCRIPTION OF THE INVENTION.

Figure 1:
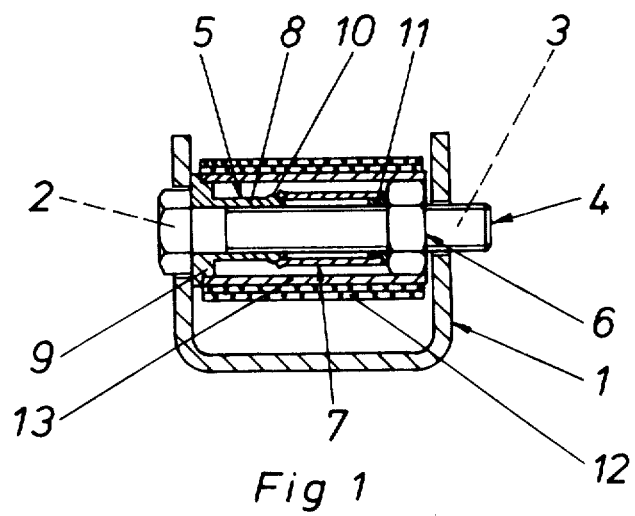
FIG. 1 is a cross-sectional, elevational view of one embodiment of an unwinding device according to the invention.

Referring to the embodiment of FIG. 1, unwinding device housing 1 has a generally U-shaped cross-section and is a rigid, non-formable structure. Housing 1 is fixedly attached to the body of a vehicle or any other object (not shown) to which a person or other object is to be securely strapped.

The two upright walls of housing 1, which between them define the bottom surface of the U-shaped housing, are provided with holding means 2 and 3 through which screw spindle 4 is received. Screw spindle 4 is a conventional hexagonal head, threaded bolt. Holding means 2 defines a cooperating hexagonally shaped opening to hold screw spindle 4 non-rotatably in housing 1. Holding means 2, 3 securely group spindle 4 and prevent axial shifting of screw spindle 4 through housing 1. The shaft of screw spindle 4 is conventionally threaded. Screw spindle 4 may be introduced into housing 1 by axial insertion through holding means 2 and then 3. However, holding means 2, 3 may be provided with respective inlet slots leading from the edges of housing 1 and through these slots, spindle 4 may be passed sideways into holding means 2, 3.

Coaxially positioned on screw spindle 4 are two spaced abutments 5, 6 between which is positioned energy dissipator element 7.

Abutment 5 faces the head of screw spindle 4, and is journaled on spindle 4 at 8. Below described sleeve 13 is supported for rotation about spindle 4 on abutment 5. This abutment may be non-rotatable about spindle 4, in which case sleeve 13 slides around it. Preferably abutment 5 is rotatable around the shaft of spindle 4, by unwinding sleeve 13. Toward the head of spindle 4, abutment 5 is provided with double stepped flange 9 for receiving unwinding sleeve 13. The other end of abutment 5, which faces toward abutment 6, is provided with an external circumferential bead 10 having a cross-section greater than that of element 7 and which cross-section tapers generally conically narrower toward abutment 6. This creates a conically tapering wider outward path along which dissipator element 7 must travel when the abutments move together, as described below.

Abutment 6 is comprised of a simple hexagonal nut which is carried on and is internally threaded to mate with the threads of screw spindle 4. Adjacent to the inwardly facing side of abutment 6 is positioned two step sleeve 11 for receiving energy dissipator element 7. Energy dissipator element 7 is a substantially rigid, yet slightly deformable, resilient sleeve of plastic material, metal, or the like. At its end facing toward abutment 5, dissipator element 7 has a small conical widening, which enables it to be centered on and supported on the conical shoulder of abutment 5 adjacent to bead 10. The opposite end of dissipator element 7 is held centrally by two step sleeve 11.

Belt 12, of which two turns are shown, is received by and wrapped around its winding spool, that is in the form of sleeve 13, to which the belt is secured in a known manner (not shown). Drawing upon the free end (not shown) of belt 12 unwinds the belt and rotates sleeve 13. Sleeve 13 is held for rotation at both of its ends and it rotates about the axis defined by screw spindle 4. The left hand end of sleeve 13 is received in one of the annular steps of stepped flange 9. The inwardly facing side of the step of flange 9 presses on the edge of sleeve 13 to hold the sleeve securely. The inner surface of flange 9 projects into the interior of sleeve 13.

The opposite end of sleeve 13 has an internal profile that conforms to the external profile of the hexagonal nut 6 about which the sleeve 13 is wrapped. The above described internal profile of sleeve 13 extends axially along the sleeve, and there is sufficient, but tightly controlled, clearance between sleeve 13 and nut 6 to permit axial sliding of the nut through the sleeve as the nut is rotated and moves along the threads of screw spindle 4. Because of the conforming profiles of sleeve 13 and nut 6, rotation of sleeve 13 will necessarily correspondingly rotate nut 6 and thereby move the abutments 5, 6 toward and away from each other. The threads on screw spindle 4 and inside nut 6 are directed such that unwinding of belt 12 and sleeve 13 moves abutments 5, 6 toward each other.

In FIG. 1, energy dissipator element 7 is in the loose contact or initial assembly position. The initial installation position of energy dissipator element 7 would preferably differ from what is represented in FIG. 1 because an initial torque 4 should be given to nut 6 in order to prestress dissipator element 7. In the usual installation, after the belt has been desirably partially unwound to strap the wearer securely in the vehicle or the like, the rotation of nut 6 against dissipator element 7 causes initial prestressing by causing the left hand end of element 7 to move over and possibly even pass the apex of bead 10 on abutment 5. As an alternative to relying upon the initial prestressing which occurs upon a wearer's first strapping himself into position, initial prestressing can be provided upon assembly of the elements.

In an emergency situation, upon the belt 12 being rapidly unwound from sleeve 13, nut 6 is rapidly rotated and pushes element 7. Energy dissipator element 7 provides great resistance to rapid axial motion of nut 6 and this slows or stops the unwinding of belt 12, which is the purpose of the invention.

Figure 2:
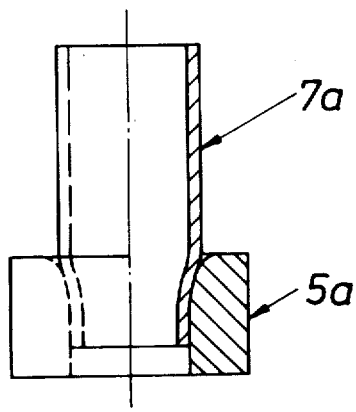
FIG. 2 is a view partially in section which shows the connection between an energy dissipating element and one of the abutments of the unwinding device in a second embodiment of the invention.

Referring to FIG. 2, energy dissipator element 7a there illustrated does not extend past the outside of abutment 5, as in FIG. 1. Instead, dissipator element 7a is conically tapered inwardly from a wider cross-section to a narrower cross-section at one end. Abutment element 5a has a correspondingly tapered shoulder of the narrower cross-section, which causes desired inward deformation of dissipator element 7a to absorb the kinetic energy of belt unwinding.

In FIGS. 3 and 4, energy dissipator element 7b is comprised of a hollow sleeve having at least one circumferential, radially inwardly directed crimp formed intermediate its ends. As shown in FIG. 3, in the unstressed condition the crimp is relatively elongated in the axial direction. When dissipator element 7b is stressed upon rapid unwinding of belt 12, the sleeve 7b assumes the form shown in FIG. 4. Crimp 14 is displaced radially inwardly toward the interior of element 7b and is compressed, whereby dissipator element 7b collapses like a bellows and helps to absorb energy. Dissipator element 7b may optionally also be deformable with an abutment like any of abutments 5 illustrated herein.

In FIG. 5, dissipator element 7 is of the type described in connection with FIG. 1. But, abutment 5b tapers gradually wider in cross-section, moving away from its end facing toward dissipator element 7. There are two separate conical tapers spaced axially along abutment 5b. Axially following each taper is a cylindrical region. The alternation of conical and cylindrical regions axially along abutment 5b will naturally influence the motion of energy dissipator element 7 and will have a controlled varying effect upon the torque force exerted by abutment 6 in resisting the rotation of spool sleeve 13 and the unwinding of belt 12. As belt 12 unwinds or at different unwinding positions of the belt, there will be different resistances to rapid unwinding and different extents of dissipation of kinetic energy.

FIG. 6 shows an abutment 5c which has other conical and cylindrical sections extending axially along its length for bringing about different energy dissipation results as the dissipator element 7c passes over abutment 5c. One significant characteristic of abutment 5c is circumferential indented groove 15. The resistance to axial motion of dissipator element 7c and thus the resistance to rotation of nut 6 will be considerably reduced when element 7c is passing over the axial section of abutment 5c defined by groove 15.

Energy dissipator element 7c is comprised of two coaxial sleeves, unlike the single thickness sleeves of energy dissipator elements 7, 7a, and 7b already discussed. Dissipator element 7c is comprised of an interior sleeve that is nested securely immovably in an exterior sleeve. The interior sleeve is shorter in axial length than the exterior sleeve. At the start of the shifting of element 7c upon the initial application of torque force by nut 6, the outer sleeve of element 7c is pushed over abutment 5c. The outer sleeve offers a lesser resistance to axial motion of dissipator element 7c. When the inner sleeve of dissipator element 7c finally bears against abutment 5, the two sleeves then together cooperate to exert greater resistance against axial motion of dissipator element 7c, rotation of nut 6, and unwinding of belt 12. As shown by the arrangement of FIG. 6, control over too rapid unwinding of belt 12 can be obtained by varying the design of at least one abutment 5 and/or by varying the characteristics of dissipator element 7.

There has just been described a novel unwinding device for safety belts, or the like, including an energy dissipator, wherein the winding spool sleeve which carries the belt to be unwound is rotatable about a non-rotatable axial spindle and in turn rotates the first of two energy dissipating abutments around the spindle. This first abutment is shifted axially along the spindle toward the second abutment by unwinding of the belt. Between the first and second abutments is supported an energy dissipating element which is squeezed between the abutments as they move together. In a preferred arrangement, at least one of the abutments is shaped so as to cause the dissipating element to be deformed as the abutments move together. The dissipating element is squeezed between the abutments and/or it is forced past one of the abutments which causes its deformation. In a modified arrangement, it can be the abutment that is deformed rather than the dissipator element.

Although there have been described preferred embodiments of this novel invention, many variations and modifications will now become apparent to those skilled in the art. Therefore, this invention is to be limited not by the specific disclosure herein, but only by the appending claims.

The embodiments of the invention in which an exclusive privilege or property is claimed are defined as follows:

1. Unwinding device with energy dissipator for a wound belt, comprising:
   a belt;
   a spool on which the belt that is to be unwound is wound; said spool having a first axis; means for supporting said spool for rotation about said first axis, thereby to unwind said belt;
   a spindle separate from said spool; said spindle having a second axis; a support for said spindle;
   energy dissipation means for dissipating the energy of unwinding of said belt from said spool; said dissipation means comprising a first abutment, a second abutment, and an energy dissipator element;
   said first abutment being carried on said spindle and being engaged therewith in a manner such that rotation of said first abutment around said spindle also moves said first abutment along said spindle and along said second axis; said first abutment being connected with said spool such that said first abutment is rotated around said spindle upon rotation of said spool and that rotation of said spool to unwind said belt rotates said first abutment in a first direction;
   said second abutment being near said spindle, being spaced from said first abutment and being supported axially non-shiftably with respect to said spindle such that rotation of said first abutment in said first direction moves said first abutment toward said second abutment;
   said energy dissipator element extending across the space between said first and said second abutments and engaging both said abutments;
   at least one part of said energy dissipation means being comprised of a relatively hard, yet deformable material such that movement together of said abutments causes deformation of the said deformable part and this absorbs the kinetic energy of unwinding of said spool without deforming said spool.

2. The unwinding device of claim 1, wherein the said deformable part of said energy dissipation means comprises said energy dissipator element.

3. The unwinding device of claim 2, wherein one of said abutments has a profile of a first cross-section and said dissipator element has a profile of a second cross-section; said second cross-section being different from said first cross-section; said dissipator element being deformable from said second cross-section to said first cross-section upon said abutments moving together and forcing said dissipator element to move past the one said abutment.

4. The unwinding device of claim 1, wherein said spool is a hollow sleeve and said spindle is inside said spool.

5. The unwinding device of claim 4, wherein said first abutment is movable inside said spool;
   said spool has a predetermined interior profile that is axially elongated along said second axis; said first abutment has an external profile that is shaped and positioned such that said first abutment profile and said spool profile matingly engage for rotation of said spool to rotate said first abutment.

6. The unwinding device of claim 5, wherein said spool sleeve is at one end carried on said first abutment and is at the other end carried on a section of said second abutment, which said second abutment section is spaced further from said first abutment than is the area at which said dissipator element engages said second abutment.

7. The unwinding device of claim 5, wherein the said deformable part of said energy dissipation means comprises said energy dissipator element.

8. The unwinding device of claim 5, wherein said first and said second axes are coaxial.

9. The unwinding device of claim 8, wherein said first abutment is comprised of a nut having an internal screw thread and said spindle has a mating elongated external screw thread thereon.

10. The unwinding device of claim 5, wherein said second abutment is journaled on said spindle and is axially non-movable therealong.

11. The unwinding device of claim 10, wherein said dissipator element comprises a sleeve that is around and spaced from said spindle;
said spool sleeve is at one end carried on said first abutment and is at the other end carried on a section of said second abutment, which said second abutment section is spaced further from said first abutment than is the area at which said dissipator element engages said second abutment.

12. The unwinding device of claim 5, further comprising a housing which includes said support for said spindle and in which said spool is positioned.

13. The unwinding device of claim 12, wherein said spindle comprises a bolt having a polygonally shaped head; said housing having walls through and between which said spindle passes; one said housing wall having an opening that is shaped to said bolt head for holding said head against both rotational and axial shifting.

14. The unwinding device of claim 13, wherein said first abutment is comprised of a nut having an internal screw thread and said spindle has a mating elongated external screw thread thereon along which said nut moves.

15. The unwinding device of claim 14, wherein the said deformable part of said energy dissipation means comprises said energy dissipator element.

16. The unwinding device of claim 15, wherein said dissipator element comprises a sleeve that is around and that is spaced from said spindle.

17. The unwinding device of claim 16, wherein one of said abutments has a profile having a first cross-section; said dissipator element sleeve having a second cross-section; said first and second cross-sections being different; said dissipator element sleeve being deformable from said second cross-section to said first cross-section upon said abutments moving together and forcing said dissipator element to move past the one said abutment.

18. The unwinding of claim 5, wherein said dissipator element comprises a sleeve that is around and that is spaced from said spindle.

19. The unwinding device of claim 18, wherein said dissipator element sleeve is comprised of two coaxial sleeves, both of which are deformable; one of said dissipator element sleeves extending further toward the one of said abutments than the other of said dissipator element sleeves, thereby to vary the dissipation of kinetic energy during the unwinding.

20. The unwinding device of claim 18, wherein said dissipator element has at least one circumferentially extending crimp, which is collapsible to shorter axial length upon said abutments moving together and squeezing said dissipator element therebetween.

21. The unwinding device of claim 18, wherein one of said abutments has a profile having a first cross-section; said dissipator element sleeve having a second cross-section and said first and second cross-sections being different; said dissipator element sleeve being deformable from said second cross-section to said first cross-section upon said abutments moving together and forcing said dissipator element to move past the one said abutment.

22. The unwinding device of claim 21, wherein said dissipator element sleeve is comprised of two coaxial sleeves, both of which are deformable; one of said dissipator element sleeves extending further toward the one of said abutments than the other of said dissipator element sleeves, thereby to vary the dissipation of kinetic energy during the unwinding.

23. The unwinding device of claim 21, wherein said spool sleeve is at one end carried on said first abutment and is at the other end carried on a section of said second abutment, which said second abutment section is spaced further from said first abutment than is the area at which said dissipator element engages said second abutment.

24. The unwinding device of claim 21, wherein the one said abutment is said second abutment.

25. The unwinding device of claim 21, wherein the one said abutment has a generally conically tapered section past which said dissipator element moves, said tapered section tapers in a direction which increasingly deforms said dissipator element sleeve as that said sleeve moves in a second direction away from the other said abutment.

26. The unwinding device of claim 25, wherein said tapered section tapers wider in said second direction and said dissipator element sleeve passes outside said tapered section.

27. The unwinding device of claim 25, wherein said dissipator element sleeve tapers narrower in said second direction and said dissipator element sleeve passes inside said tapered section.

28. The unwinding device of claim 21, wherein the one said abutment has a circumferential bead around it; said bead being located near the point of initial engagement with said dissipator element sleeve; said dissipator element sleeve being shaped and positioned to move over and past and to be deformed by said bead as said dissipator element sleeve is moved by the motion together of said abutments.

29. The unwinding device of claim 28, wherein the one said abutment has a plurality of said circumferential beads around it that are arrayed apart axially along the one said abutment; said beads having different respective cross-sections that gradually increase in size, moving away from the point of initial engagement of said dissipator element sleeve and the one said abutment.

30. The unwinding device of claim 29, further comprising a circumferential groove of lesser cross-section between two of said beads of greater cross-section.

* * * * *